(12) United States Patent
Holden et al.

(10) Patent No.: US 6,587,228 B1
(45) Date of Patent: Jul. 1, 2003

(54) DOUBLE-SIDED SCANNER (75) Inventors: Douglas A. Holden, St. Charles, MO (US); David B. Whitten, St. Charles, MO (US)

(73) Assignee: Hasco International, Inc., Earth City, MO (US)

( * ) Notice: Subject to any disclaimer, the term of this patent is extended or adjusted under 35 U.S.C. 154(b) by 0 days.

(21) Appl. No.: 09/538,468

(22) Filed: Mar. 29, 2000

(51) Int. Cl.[7] .............................. H04N 1/04; H04N 1/00
(52) U.S. Cl. ................... 358/474; 358/496; 358/408; 358/498
(58) Field of Search ............................ 358/474, 408, 358/496, 498

(56) References Cited

U.S. PATENT DOCUMENTS

| 4,429,333 A | 1/1984 | Davis et al. |
| 4,743,974 A | 5/1988 | Lockwood |
| 4,908,719 A | 3/1990 | Nonoyama |
| 4,949,189 A | 8/1990 | Ohmori |
| 5,136,665 A | 8/1992 | Inoue |
| 5,412,485 A | 5/1995 | Kashiwagi |
| 5,568,573 A | 10/1996 | Wada et al. |
| 5,986,775 A * | 11/1999 | Yoshimizu .................. 358/496 |
| 6,333,795 B1 * | 12/2001 | Kaji ........................... 358/474 |
| 6,400,472 B1 * | 6/2002 | Yoshimizu .................. 358/498 |

* cited by examiner

*Primary Examiner*—Edward Coles
*Assistant Examiner*—Houshang Safaipour
(74) *Attorney, Agent, or Firm*—Blackwell Sanders Peper Martin LLP; Mark E. Stallion (57) ABSTRACT

A method and apparatus for double-sided scanning of a paper document comprising diagonally offset scanner and traction pinch roller pairs thereby forming a zero-gravity traction feed. The zero-gravity traction feed allows the scanning apparatus to be oriented in varying positions while maintaining full operation. The scanner is adapted to scan a two-sided document by flip-flopping between two scanners whose field of views each face opposing sides of the document.

13 Claims, 9 Drawing Sheets

DOUBLE-SIDED SCANNER

BACKGROUND OF THE INVENTION

1. Field of the Invention

This invention relates to scanning of plain paper documents and more specifically relates to an apparatus for and methods of feeding and scanning plain paper documents and communicating the scanned data to a host computer.

2. Related Art

The ability to scan plain paper documents and store the scanned data in a format such that a host computer can build a humanly definable image and reproduce the document at will is essential in today's society of paperless and seamless computerized networks. It is also essential that a host computer have the ability to interpret the scanned data in order to establish the content of the document to perform secondary functions. Also, because of the various specific applications and operating environments and because of the varying formats of hard copy plain paper documents, it is essential that any apparatus for or method of scanning is flexible and adaptable to various hardware interfaces. The apparatus must fit within an allotted space, therefore, a small profile is desirable. The document may vary in length and width depending on the specific document to be scanned and the document may be single-sided or double-sided. Also, most users of scanners are not trained computer or electronic hardware technicians, and many have never used such a device or have used them infrequently. Therefore, the operation of any scanner should be simple, straight forward and user friendly.

Flatbed scanners are commonly used for many applications. However, flatbed scanners are neither compact in size, nor can they be oriented in any other manner other than in an upright position with the scan window face up. Also, flatbed scanners do not provide double sided scanning. There are traction feed scanners that are more compact in size than flatbed scanners, but double-side scanning is not typically a standard feature, nor can the scanner operate with accurate traction feed when oriented other than in an upright position. If the scanner is oriented in any other manner than in an upright position, it is likely that the proper traction pressure between the traction means and the paper document will not be maintained, therefore; it is likely that a misfeed or a corrupted scan image will occur. There are also hand held scanners; however hand held scanners result in a lesser quality image, and the hand held scanner will be unable to house a conventional controller board for special image data manipulation functions or for interfacing with a host computer. Also, a typical hand held scanner is likely not able to scan an entire full-page document without multiple passes of the scanner. It is noted that scanners are sometimes only a small part of an overall document handling system. The scanners discussed above other than the hand held scanner require an upright orientation.

SUMMARY OF INVENTION

It is in view of the above problems that the present invention was developed. It is an object of this invention to provide a plain paper document scanner that is compact in size, but which provides a high resolution double-sided image scan of documents of varying size, and a scanner which is user friendly and sufficiently flexible so that both the scanner and paper can be positioned in varying orientations and still operate.

It is also an object of this invention to interpret the scanned data and communicate it to a host computer.

The invention satisfies the above objectives by providing a method and an apparatus for double-sided scanning. The double-sided scanner comprises two basic systems. The first is the transport hardware to move the media past the image capture sensors that are diagonally offset with respect to one another. The second is the controller board that interprets the data being sent by the image capture sensors and the communications port to transfer this data to the host computer. If the user inserts a one-sided paper document in up side down or with the wrong orientation, a successful scan of the document should still be performed.

The transport is made up of a DC powered stepper motor, two pinch rollers, two image capture sensors (image scanners), and two sets of optical sensors (paper motion sensors) to control the turning on of the motor when paper is inserted into the scanner. The two rollers are each paired with one of the image capture sensors where each pair forms a tangential contacting relationship. The zero-gravity design of the transport system allows the scanner assembly to be oriented in any manner.

The controller board is designed with two major areas of logic. The first is the area that receives and interprets the data being captured by the image sensors. The second is the area that communicates to the host computer.

BRIEF DESCRIPTION OF THE DRAWING

The advantages of the invention can be more clearly understood by referring to the accompanying drawing, in which.

DESCRIPTION OF INVENTION

As stated previously, the double-sided scanner is made up of two basic systems. The first is the transport hardware to move the media past the image capture sensors that are diagonally offset with respect to one another. The second is the controller board that interprets the data being sent by the image capture sensors and the communications port to transfer this data to the host computer.

The controller board can be powered up via a 12 V DC-power source and a 5V DC source. The scanner can have two sets of three optical sensors that are positioned to look into the channel of the paper path. When a first set of sensors sees the leading edge of a piece of paper the controller board will turn on the transport pinch rollers. After a short delay while the paper is moving forward to reach the first image capture sensor the first image capture sensor is turned on and will start to transmit data to the A side logic set that is programmed into the firmware of the scanner. As the paper continues forward a second set of optical sensors sees the paper and will turn on the capturing of the second image capture sensor. At this time the data from the second image sensor is being sent to the B side logic set that is programmed into the firmware of the scanner. As the paper continues forward both sides of the paper are being captured at the same time by means of flip-flopping the transfer of data from the image capture sensors, the interpreting of this data, and the transfer of this interpreted data to the host Computer, typically a personal computer (PC), is accomplished via the USB communications path.

After a predetermined number of scan lines have been scanned, a count down timer will start to allow the paper to pass all the way out of the last pinch roller which is preferably made of rubber but can be any other appropriate material that will achieve the desired traction. The timer is set for a short time interval but is set to an interval long enough to allow the paper or other media to push away from the transport hardware. At this same time the controlling software on the host Computer is building a human definable image of the interpreted data stream and is also taking into account any timing and registration problems during the scanning process. These issues are addressed by taking in the first few scan lines of the image and rebuilding or lacing the data together to complete the form. On the other end of the data stream the extra scan lines from the data stream are being deleted to reduce or closely eliminate the black or dead data from the end of the image. After the timer has expired the motor is turned off and the pinch rollers stop moving.

The transport is designed as a zero-gravity transport. This means that the paper or other media will travel through the scanner no matter what position the scanner is placed in. The scanner can be upright or up side down or on its side. The transport or traction means does not rely on an upright position in order to maintain the proper traction pressure of the pinch roller. The value of this is so the transport can be used in almost any application. This is accomplished by first placing the pinch rollers (transport rubber rolls) at diagonally opposed positions with respect to each other. Second, the face of the image capture sensors or the image capture sensor port surface, through which the image is viewed, is adjacent the rubber pinch roller. The adjacent relationship between the pinch roller and the sensor port surface is a tangentially contacting interface. Third, the image capture sensors can be mounted on a custom designed z-bracket that creates a scissors action between the image capture sensors and the rubber pinch rollers. This is because the z-bracket has a pivoting point in a center portion of the z-bracket, and the opposing z-bracket extensions are attached to the ends of the image capture system. Pressure is maintained between the pinch roller and the sensor port surface through rotation of the z-bracket about the pivot point and by placing a spring or "spring-like" member between the image capture sensor and a fixed member of the chassis. A downward moment about the pivot point is applied to the image capture sensor pair and z-bracket assembly. When the media being transported through the scanner gets to the first pinch roller/image capture sensor set the thickness of the media sets the pressure for the second pinch roller/image capture sensor. This not only applies consistent transport pressure in any physical position but it most importantly allows for the media to change thickness. This is very important for the transport of different media types and to accommodate the operator having tape or a staple in the media.

The controller board has two areas. The first area is for interpreting the data stream from the image capture sensors. This is done by controls in the firmware to handle the data from each image capture sensor. The data needs to be stored based on the sensor that it was received from. The data is stored in blocks of alternating scan lines to a FIFO buffer. A scan line consists of all pixels in a sensor element. Once the buffer is full, the data is handed off to the host computer via USB and is ready for another block of data. This process will take place thousands of times to accommodate the capturing of both sides of the media.

The rest of this logic is made up of a variety of control components to keep the process on track. There are video chips for processing the data and a motor controller for running the transport and keeping the timing of the whole process on track.

The communication side of the controller will next be described. A USB controller along with an external EEPROM which holds the firmware, is used to communicate image data to the host machine, a personal computer or the like.

Figure 1:
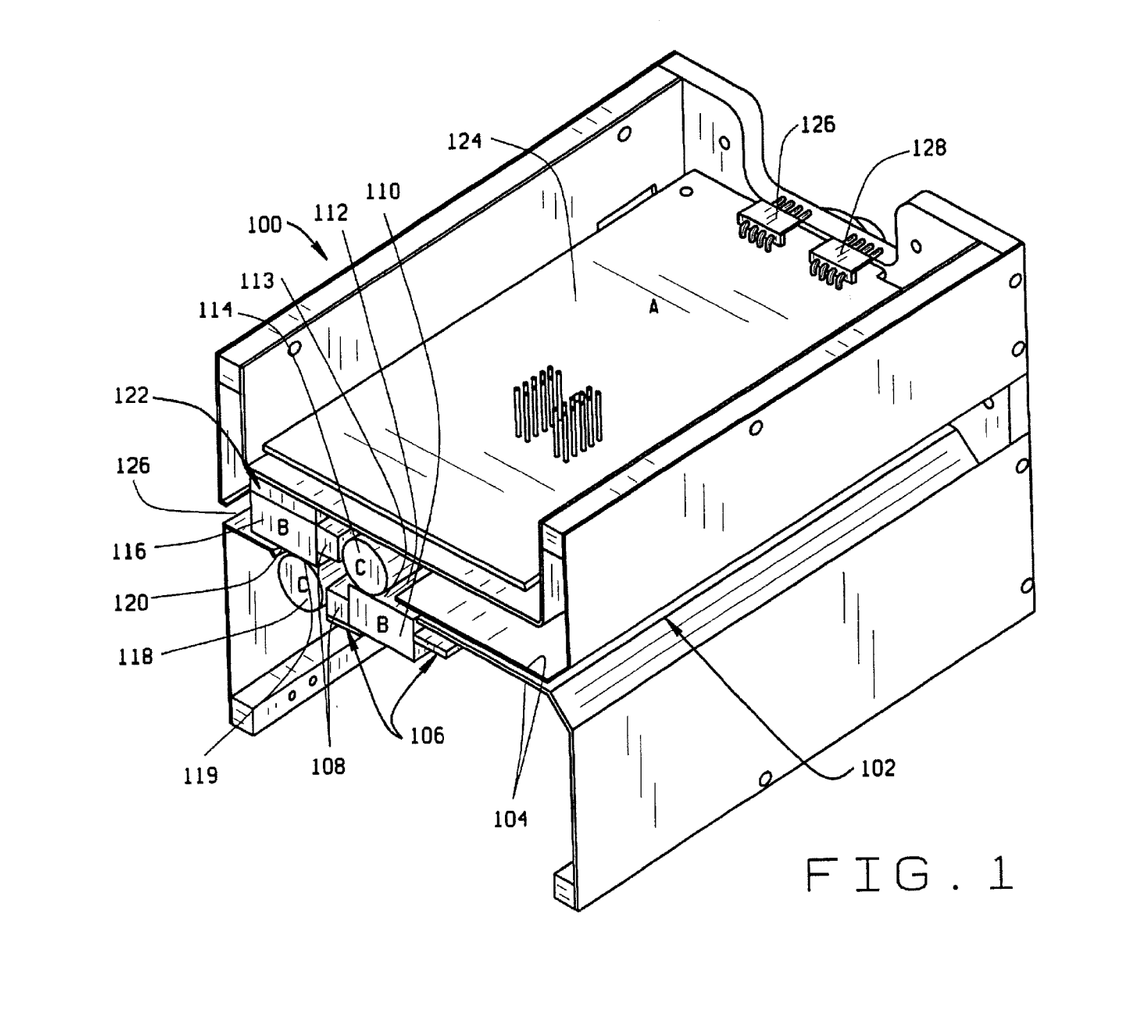
FIG. 1, shows a left-front perspective cross sectional view of a scanner assembly.

This invention can be better understood by referring to the drawing. Referring to FIG. 1, a left front perspective cross-sectional view of the double-sided scanner 100 is shown. The entry point 102 where the paper document is to be inserted is clearly shown. Extending from the entry point 102 there is a guide channel 104 extending from said entry point to guide the paper document to the scanning assembly. Along the path of the travel of the paper there are multiple paper motion sensors that detect the position of the paper document. The paper motion sensors 106 are shown. The optical motion sensor is shown as the preferred embodiment. The optical motion sensor senses the paper document as it approaches the first scanner assembly. When the insertion of a paper document is detected, the pinch rollers 114 and 118 are driven in such a manner as to capture and feed the paper across the scanning devices, image capture sensors 110 and 116, commonly called image sensors or scanners.

The paper document is first engaged by the first pinch roller 114. The first pinch roller 114 has a tangentially contacting relationship 113 with the first image capture sensor 110. The tangentially contacting relationship 113 is specifically between the roller 114 and the image capture sensor port surface 112 through which an image is viewed and across which a document passes. For simplicity's sake, the first image capture sensor 110 will be henceforth referred to as the first image scanner or first scanner. Therefore, it can be stated that the first pinch roller 114 forms a tangentially contacting relationship 113 with the first scanner sensor port surface 112 of the first scanner 110.

As the paper document extends past the first image scanner 110, the paper document is sensed by optical sensors 108 and is engaged by the second pinch roller 118. The pinch roller 118 captures and feeds the paper document past the second image scanner 116. The second pinch roller 118 forms a tangentially contacting relationship 119 with the second scanner sensor port surface 120 of the second image scanner 116. As the paper document travels over the first and second image scanners, the document is scanned by said scanners in an alternative flip-flopping relationship. The first scanner 110 initiates this scanning process and then subsequently the second scanner 116 follows. And they alternate in a flip-flopping manner until both sides of the document are completely scanned.

The document is scanned for a predetermined number of scan lines at which time the motor is jogged for about another ½ inch to insure the document has fully exited the scanner through the exit pathway 126. FIG. 1 also shows a controller board 124 and communication ports 126 and 128, whose function will be discussed in more detail when discussing FIG. 5 of the drawing. Also, the spring device 122 (a member or material having spring-like qualities) can be seen from this cross-sectional view and again this will be discussed in greater detail when discussing subsequent figures.

Figure 2:
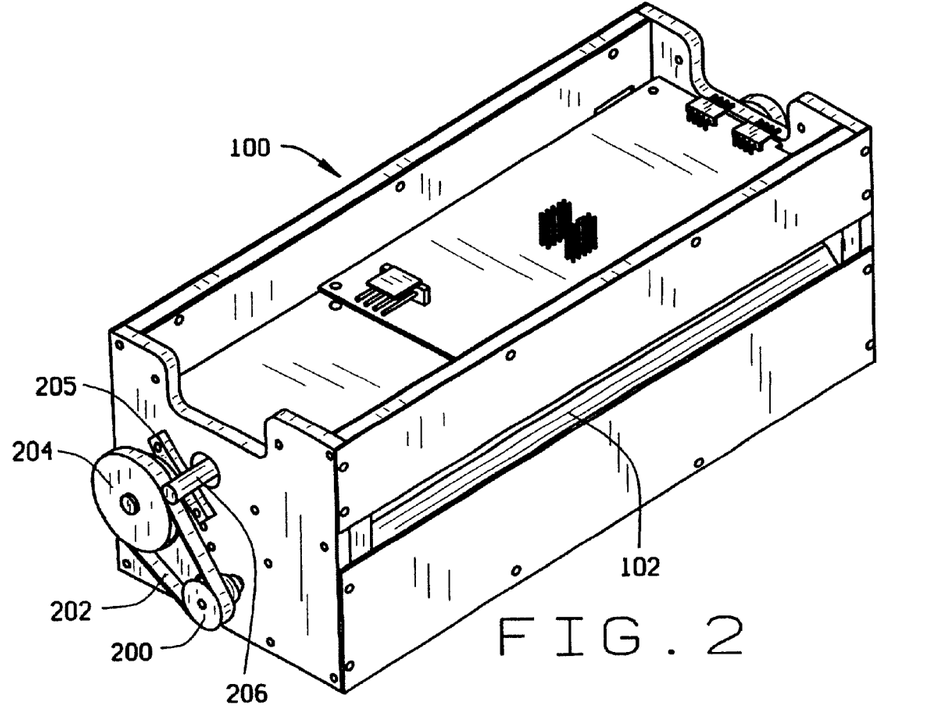
FIG. 2, shows a left-front perspective view of the scanner assembly of FIG. 1.

Referring to FIG. 2, a left front perspective view of the double sided scanner 100 is shown. This view again shows the entry point 102 where the paper is inserted. In addition, this figure shows the drive means for driving the pinch roller members. The pulley wheel 200 is powered by a stepper motor that is not shown in this view. Pulley wheel 200 is operatively connected to pulley wheel 204 by a pulley belt 202. Pulley wheel 204 follows the stepper drive means provided to pulley wheel 200. Also seen in this view is axle member 206 which acts as an axle for pinch roller 114 shown in FIG. 1. Also seen is support bar 205 whose function is described herein.

Figure 2A:
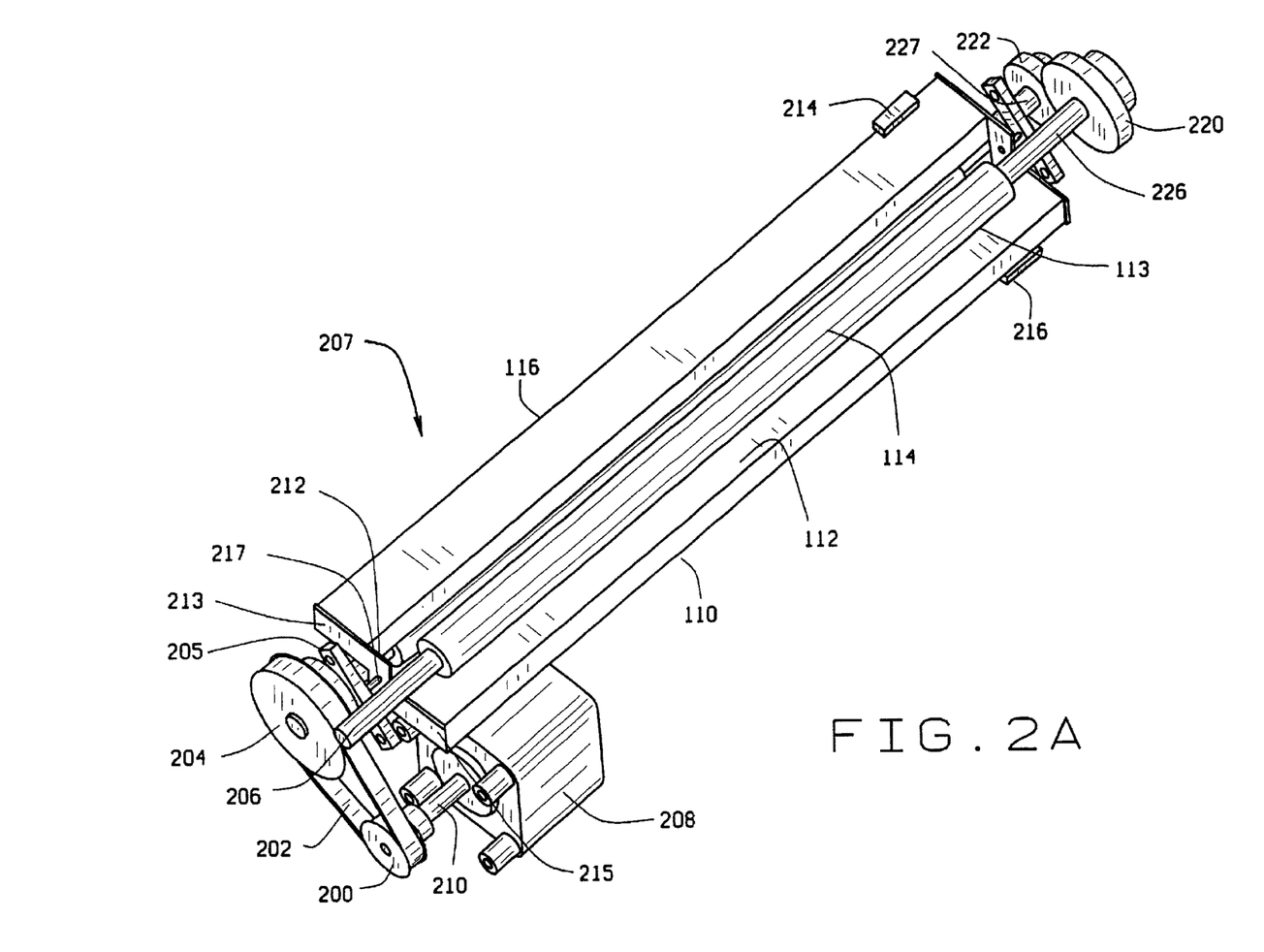
FIG. 2A, shows a left-front perspective view of a zero-gravity transport feed system.

Referring to FIG. 2A, a left front perspective view of the zero-gravity transport feed and scanning system 207 is shown. In this view the pulley wheels 200 and 204 are again shown and the pulley belt 202 is shown. In this view the stepper motor 208 can be clearly seen as well as the axle member 210 that connects the pulley wheel 200 to the stepper motor 208. The pulley wheel 204 provides a drive means for the second pinch roller 118 shown in FIG. 1. The drive means provided to pinch roller 118 is translated to pinch roller 114 by way of the first and second gears 222 and 220 that have a gear interfacing relationship. The second gear member 222 translates the drive means to the first gear member 220 which in turn provides the drive means to the first pinch roller 114 by way of axle member 226. The first and second gears 222 and 220 are attached to the ends of roller axle members 227 and 226.

The tangentially contacting relationship 113 between the pinch roller 114 and the first scanner sensor port surface 112 is more clearly shown in this view. It is through this sensor port surface that the image is viewed by the electronic optical sensing device housed in the image capture sensor assembly or scanner assembly. The field of view of the electronic sensing device is directed out through the sensor port surface. The sensor field of view of the scanner 110 is directed in a first direction, upward as shown. The field of view of the second image capture sensor 116 or scanner is directed in a second direction which is opposite said first direction, down as shown.

Also, the diagonally offset relationship between the image scanners 110 and 116 can be clearly seen. It is also shown in this view the z-bracket 212 which is attached to the image scanners 110 and 116. The z-bracket 212 has two extension members 213 and 215 that extend from a central portion 217 of the z-bracket and each of said extensions are attached to the ends of the first and second image scanners. Also, the central portion 217 of the z-bracket can be seen just behind the axle member 206. The pivoting point for the z-bracket is located in the central portion 217 of z-bracket 212. The z-bracket 212 is adapted to rotate about said pivoting point. Also seen in this view are electrical connectors 216 and 214 for the sensors. Support bar 205 is shown and is adapted to mount to a chassis structure.

Figure 2B:
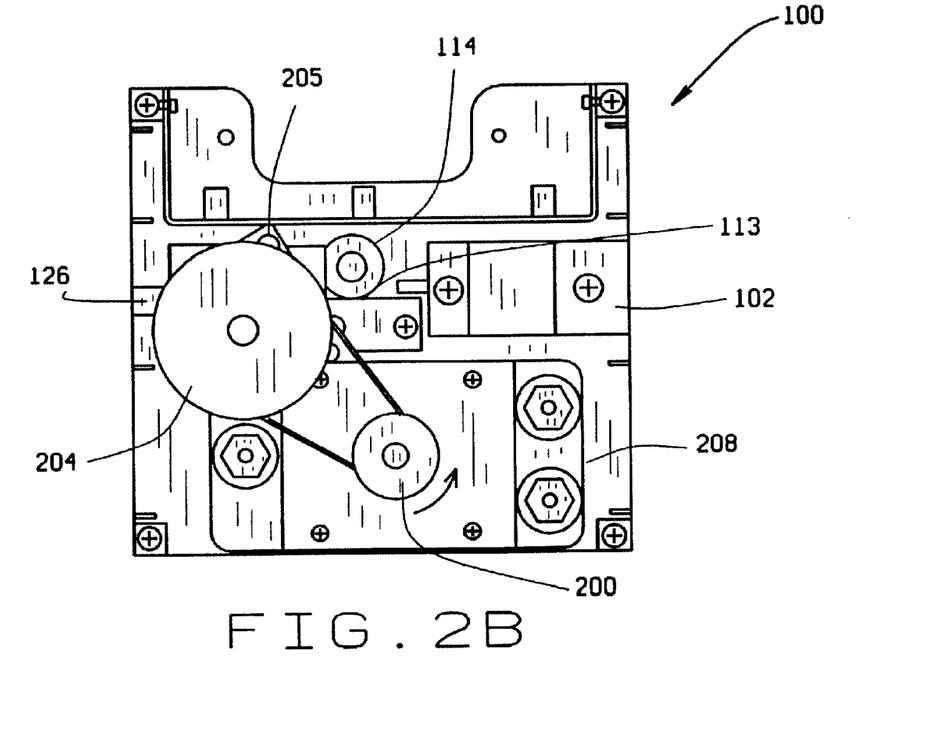
FIG. 2B, shows a left side view of the scanner assembly.

Referring to FIG. 2B, a left side elevational view of the scanner is shown. This left side view of the scanner is shown with the outside cover removed. A side view of the stepper motor 208 and the pulley wheels 204 and 200 is shown. A side view of the path that the paper document travels can be clearly seen from this side view. The paper document enters at entry point 102 and travels through channel 104 as seen in FIG. 1 which has been cut away in this view and is captured by the tangentially contacting relationship 113 between the first pinch roller 114 and the first scanner 110 as shown in FIGS. 1 thru 2A. The document exits the scanner at exit point 126.

Figure 3:
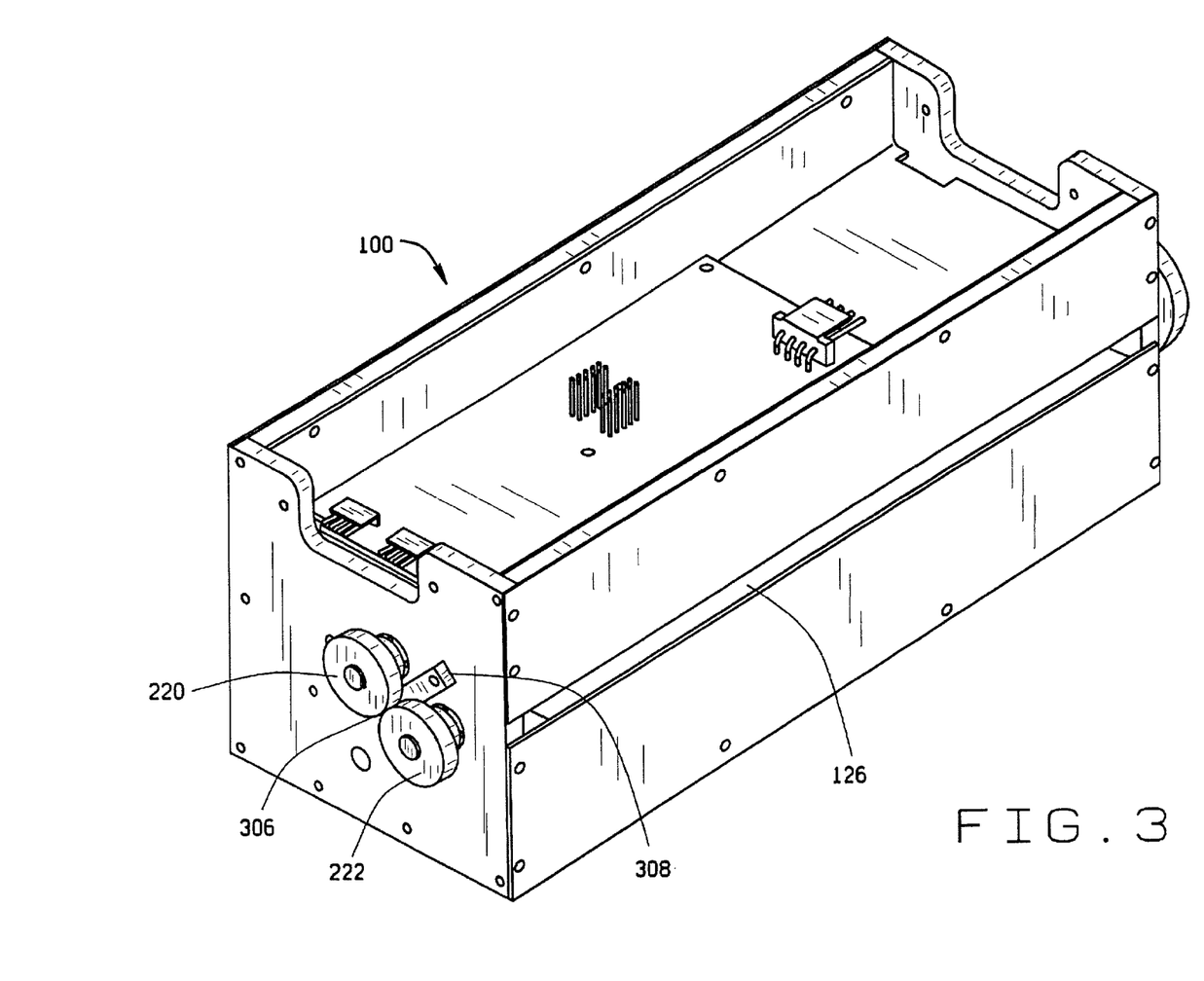
FIG. 3, shows a right-rear perspective view of the scanner assembly.

Referring to FIG. 3, a right rear perspective view of the double-sided scanner 100 is shown. In this view the exit point 126 is more clearly shown. Also shown in this view are the first and second gear members 220 and 222 and their mating relationship 306. It is this relationship by which the drive means is transferred between the second pinch roller and the first pinch roller. Also support bar 308 is shown mounted to the chassis, which provides the same function as support bar 205 on the opposing side.

Figure 3A:
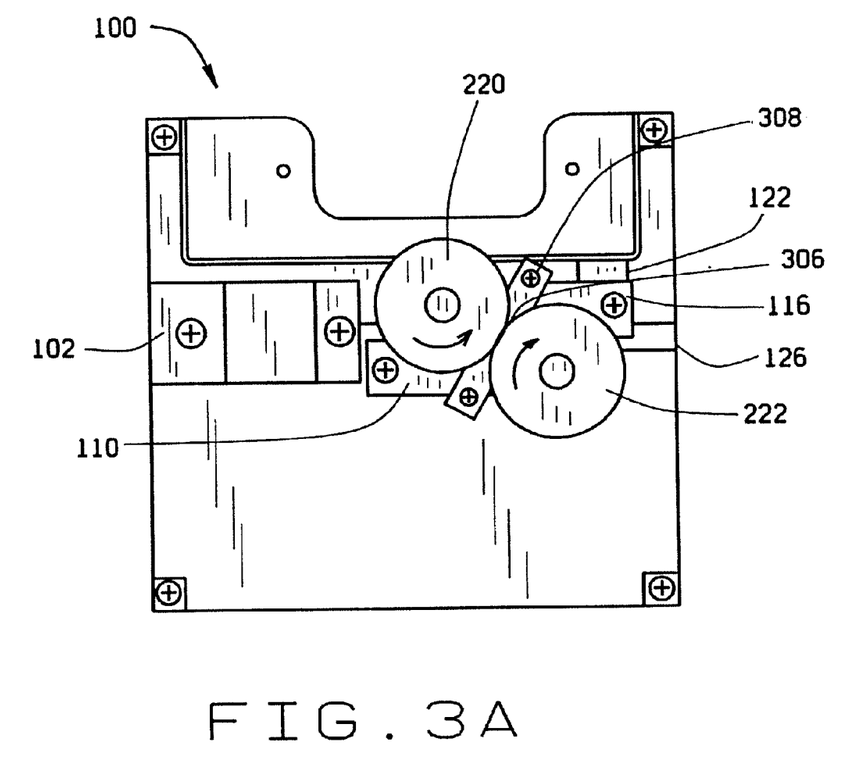
FIG. 3A, shows a right side view of the scanner assembly.

Referring to FIG. 3A, a right side view of the scanner is shown. Again the paper document travel path can be clearly seen from the opposing side. The document enters at entry point 102 and exits through exit pathway 126. It is this view that clearly shows the zero-gravity transport system. The key members to the zero-gravity traction and scanning system are the first and second gear members 220 and 222 and the related first and second pinch roller members. As stated previously, the transfer of the drive means between the second pinch roller and the first pinch roller is accomplished by way of this gear interface 306. Also as indicated, there is a tangentially contacting relationship between the first and second pinch roller members and the first and second scanner sensor port surfaces of the image scanners 110 and 116. Pressure is maintained between the pinch rollers and the sensor port surfaces by spring member 122. There is also an ability to adjust the relationship between the pinch roller and image scanner pairs by way of support bracket 308.

Figure 3B:
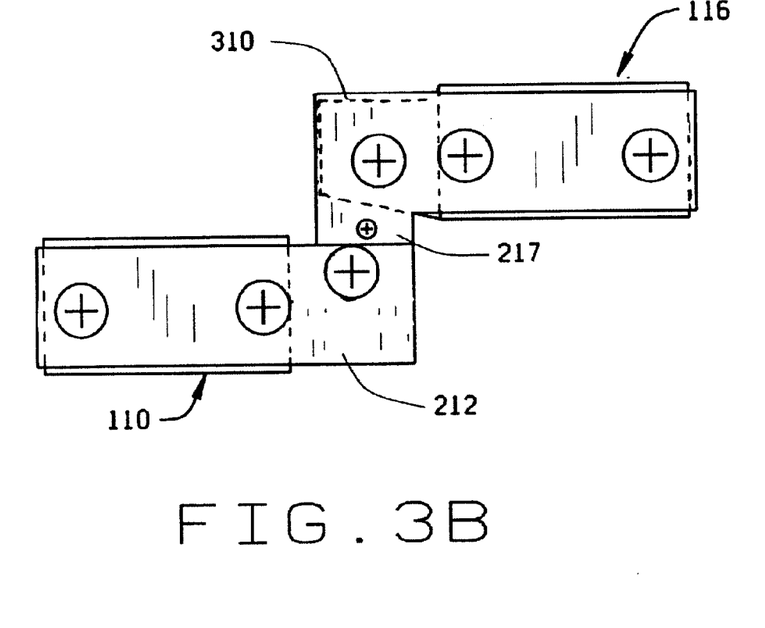
FIG. 3B, shows a right side view of the first and second scanners.

Referring to FIG. 3B, the right side view of the image scanner assembly is shown. The diagonally offset relationship between the first and second image scanners 116 and 110 can be clearly seen in this side view. Also, from this side view the central portion 217 of the z-bracket 212 and the two extending members can be clearly seen. The two extensions are shown attached to the ends of the first and second image scanners. Also seen in this view is a paper document guide 310 (shown in hidden dashed line) which assists the travel of the paper document between the first image scanner and the second image scanner.

Figure 3C:
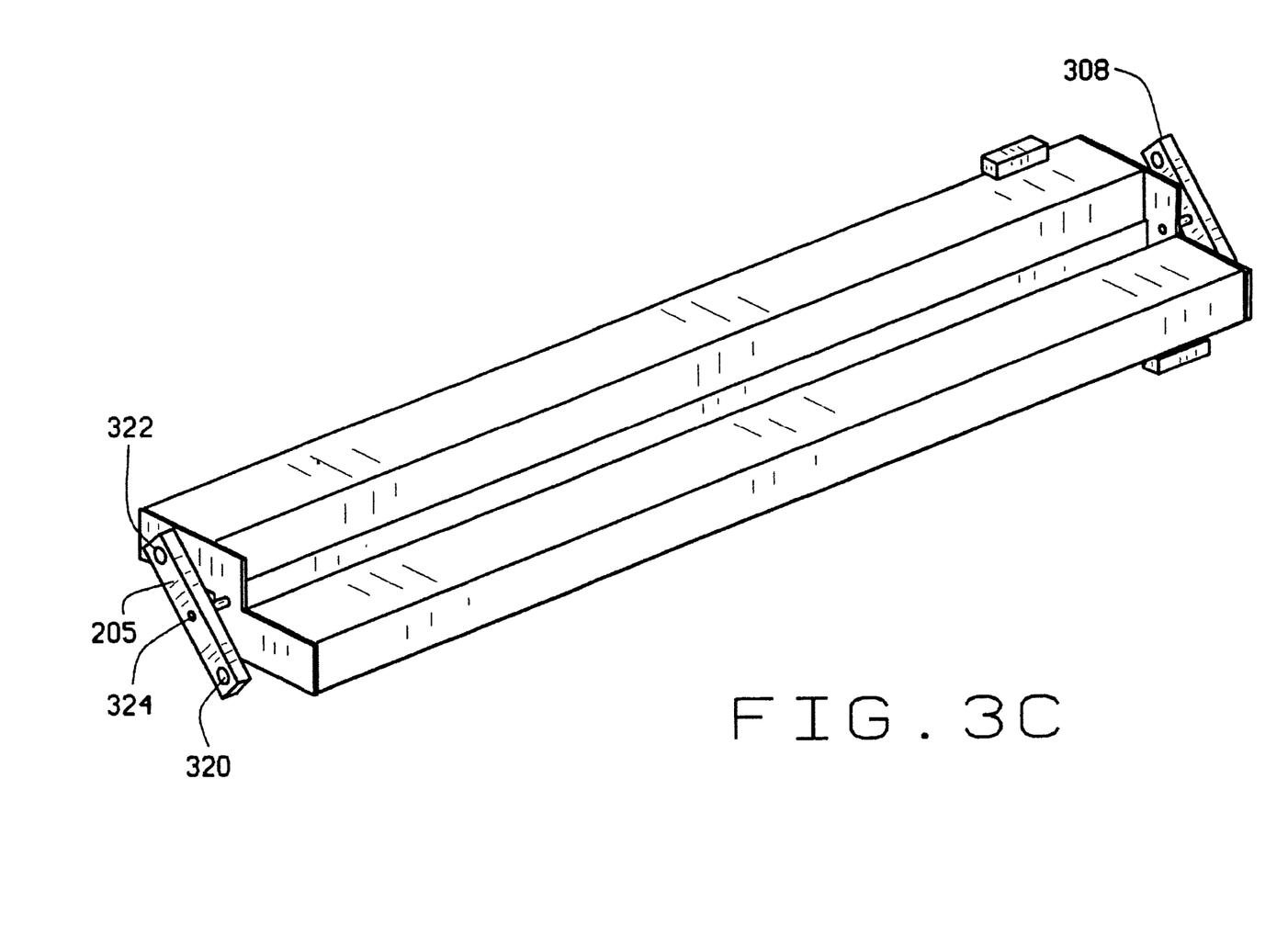
FIG. 3C, shows a right side perspective view of the first and second scanners, along with a Z bracket and support bracket.

Referring to FIG. 3C, a right side view of the support bracket 308 and 205 is shown. The function of the support bracket and its ability to adjust the relationship between the pinch roller and scanner pairs can be clearly seen from this view. The support bracket can be fixed to the chassis frame at attach points 320 and 322 which will in turn fix the position of the scanner sensor port surface with respect to the pinch roller, thereby determining the pressure contact. This orientation of these brackets 308 and 205 can be adjustable about pivoting point 324 that is connected at the central portion of the z-bracket.

Figure 3D:
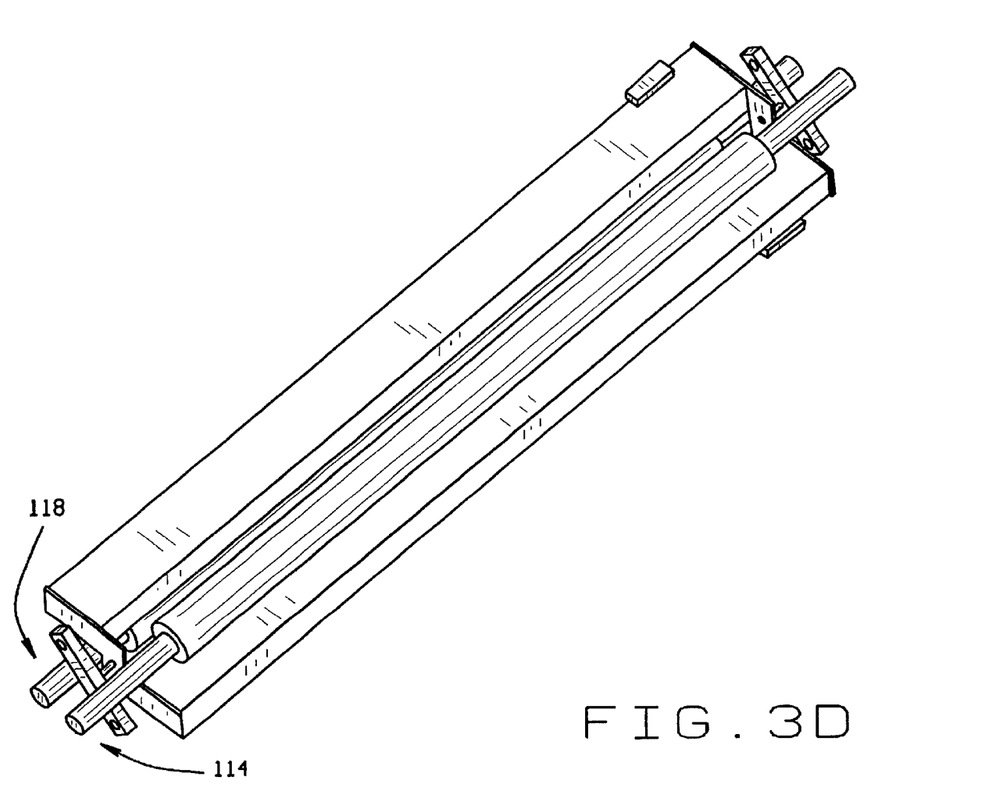
FIG. 3D, shows a right side perspective view of the first and second scanners with pinch rollers.

Referring to FIG. 3D, the pinch rollers 114 and 118 are added to the view seen in FIG. 3C, for clarity.

Figure 4:
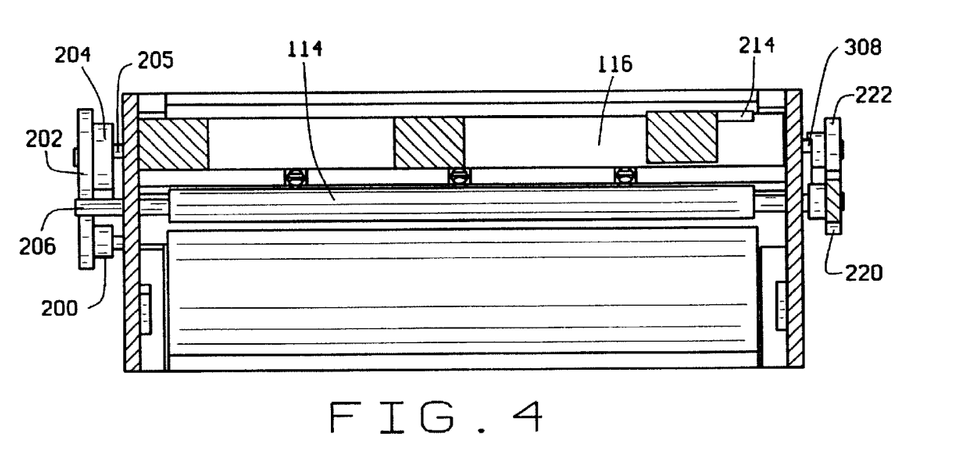
FIG. 4, shows a top view of a zero-gravity transport feed system within a scanner assembly.

Referring to FIG. 4, a top view of the zero-gravity transport feed and scanning system is shown. This view clearly illustrates that the pulley wheel 200 transfers a drive means to pulley wheel 204 by way of pulley belt 202. Pulley wheel 204 in turn provides a drive means to pinch roller 118 which is hidden from view. Second gear member 222 is attached to the second pinch roller end and in turn transfers the drive means to the first gear member 220 which in turn drives the first pinch roller 114.

Figure 5:
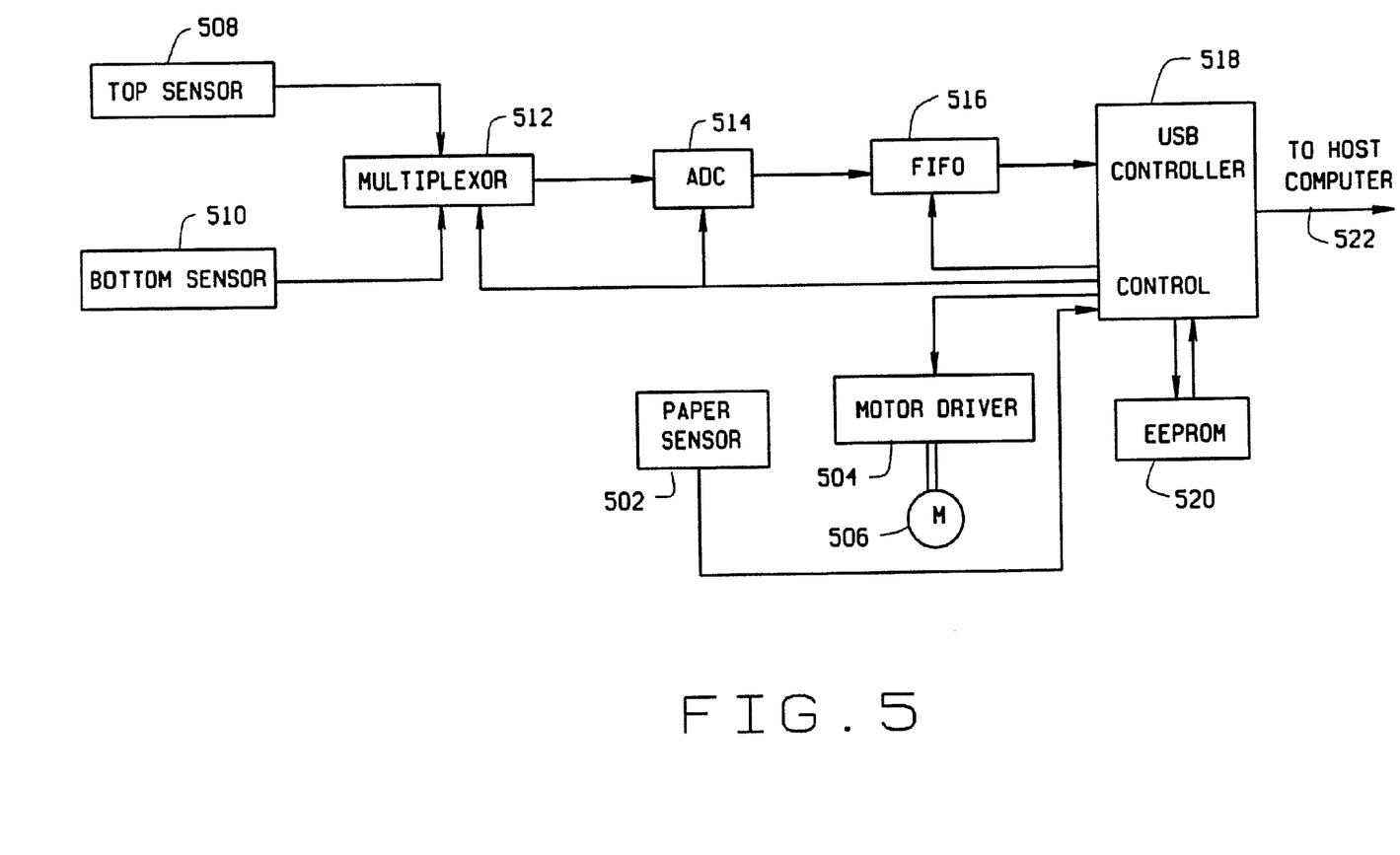
FIG. 5, shows a functional block diagram of the scanner system.
Figure 5A:
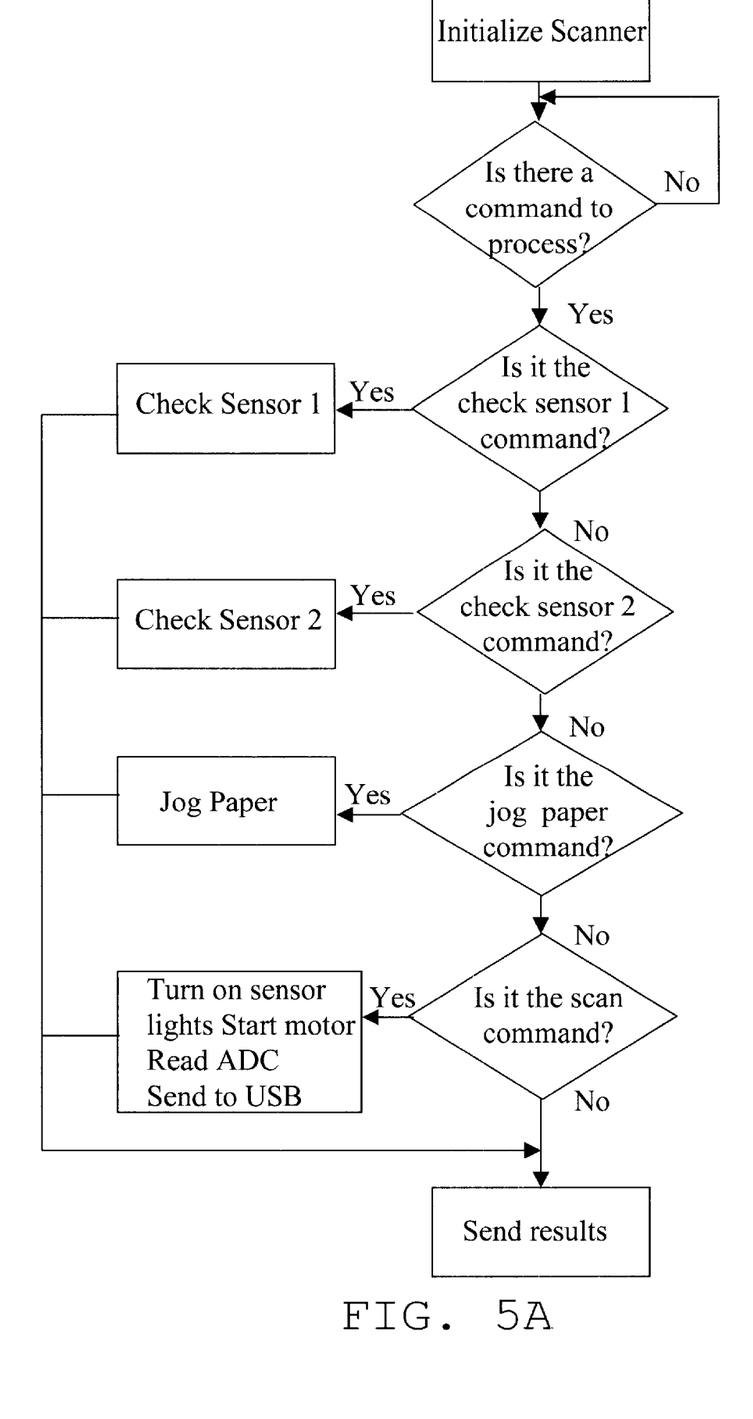

Referring to FIG. 5, a functional block diagram of the entire scanner system is shown. The scanner process is initiated when a user inserts a paper document into entry point 102 (this is referring to FIG. 1). As the paper document travels down the guide channel 104, the document is detected by a first set of paper sensors. Once detection has occurred, a signal is passed to the controller function 518 which is resident on controller board 124 shown in FIG. 1. The controller board in turn sends a signal to the motor driver 504 to start the stepper motor 506. The paper document is then captured by the pinch rollers and is transported across the first and second image sensors 508 and 510. The first and second image sensors 508 and 510 begin the scanning of the document. The first and second image sensors output their respective image data in an alternating flip-flopping manner to a multiplexer device 512. The multiplexer device multiplexes this scanned data through an analog to digital conversion circuit 514. Once the data has been converted by the analog to digital circuit 514 the data is then transferred to a first-in first-out (FIFO) buffer 516. The FIFO circuit 516 acts as a holding buffer to temporarily hold the scanned data until an entire block of data is captured. The FIFO circuit 516 subsequently passes the data onto the controller 518. The controller 518 has a built in universal serial bus interface and an associated electronic memory device 520. The memory device 520 is used to hold the scanner firmware. A flow diagram of the scanner firmware is seen in FIG. 5A. The universal serial bus interface transfers the data in a converted form to a host computer via electronic communication connection 522.

In view of the foregoing, it will be seen that the stated objects of the invention are achieved. The above description explains the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description shall be interpreted as illustrative rather than limiting. Thus, the breadth and scope of the present invention should not be limited by any of the above-described exemplary embodiments, but should be defined only in accordance with the following claims appended hereto and their equivalents.

All patents, if any, referenced herein are incorporated in their entirety for purposes of background information and additional enablement.

What is claimed is:

1. An apparatus for double-sided scanning of a paper document comprising:
   a. a first image scanner having a first sensor field of view directed in a first direction and a first scanner sensor port surface through which an image is viewed and across which a document passes and said first image scanner having first and second opposing ends;
   b. a second image scanner having a second sensor field of view directed in a second direction opposite said first direction and having a second scanner sensor port surface through which an image is viewed and across which a document passes and said second scanner is diagonally offset with respect to the first image scanner and said second scanner having third and fourth opposing ends;
   c. a first pinch roller having a first axle about which it rotates and a first gear member attached to an axle end of said first roller where said first axle is parallel to the first scanner sensor port surface and the first pinch roller is positioned in a tangentially contacting orientation with respect to the first sensor port surface;
   d. a second pinch roller having a second axle about which it rotates and a second gear member in a mating relationship with said first gear member and attached to a second axle end of the second pinch roller where said second axle is parallel to the second scanner sensor port surface and the second pinch roller is positioned in a tangentially contacting orientation with respect to the second sensor port face;
   e. a first z-bracket having a pivoting point in a central portion of the z-bracket and having first and second extensions where the first and second extensions are mounted to the first and third ends of the first and second scanners, fixing the first and second scanners at diagonally opposed positions and said z-bracket is adapted to rotate about said pivoting point where pivoting increases or decreases a pressure contact between the first and second sensor port surfaces and the first and second pinch rollers; and
   f. a drive means adapted to drive said first gear member where said second gear member will follow for advancing the media to be scanned.

2. The apparatus for optically scanning of claim 1, further comprising:
   a. a spring member attached to the first image scanner to a surface of said scanner that is opposite the first scanner port surface and said spring is positioned between the scanner and a fixed chassis member and adapted to fill a gap between the scanner and the fixed chassis member, applying a downward spring force to the scanner.

3. The apparatus for optically scanning of claim 1, further comprising:
   a. a support bar adapted to be fixedly mounted to a chassis and attached to said pivoting point of said z-bracket by an axle member having an axis about which the support bar is adapted to rotate thereby increasing or decreasing pressure between the first and second scanner sensor port surfaces and the first and second pinch rollers.

4. The apparatus for optically scanning of claim 1, where said drive means is a timing gear and stepper motor interface.

5. An apparatus for double-sided optically scanning and storing image data of a paper document comprising:
   a. a chassis having a first open slot adapted to receive a paper document and having a second open slot adapted to channel the paper document exiting the chassis;
   b. a guide channel extending from said first open slot toward the interior of the chassis;
   c. a sensor positioned along said channel adapted to sense the paper position for initiating feeding of the paper document and scanning;
   d. a first scanner having an upward directed sensor field of view and a first sensor port surface and said first surface is in tangential contact with a first pinch roller means for feeding the paper document across the sensor port surface;
   e. a second scanner having a downward directed field of view and a second scanner sensor port surface and said second surface is in tangential contact with a second pinch roller means for feeding the paper document across the second surface and said second scanner is diagonally offset with respect to the first scanner;

f. a stepper motor and timing gear adapted to drive said first and second roller means; and g. a controller system adapted to control the feeding of the paper document, the start of scanning and the storing data.

6. The apparatus for optically scanning of claim 5, further comprising:

a. a Flip-Flop electrical circuit operatively connected to said first and second scanners and adapted to alternatively switch on the first and second scanners to scan lines of image data;

b. a multiplexer electrical circuit adapted to multiplex image data from the first and second scanners to an A/D converter electrical circuit which converts the image data to a digital form that can be readily electronically stored;

c. a first in first out (FIFO) electrical circuit which receives the image data from the A/D converter and adapted to be a data buffer for temporary storage of data; and d. a universal serial bus electrical circuit interface controller adapted to electrically receive the image data from the FIFO and adapted to temporarily electronically store the image data and electronically transmit the data to a host computer.

7. A method of double-sided scanning comprising the steps of:

a. receiving a paper document through a tapered slot of a chassis;

b. sensing the position of the paper for starting a motor drive;

c. stepping the motor drive for driving a set of first and second pinch rollers;

d. grasping and conveying a document with said first and second pinch rollers pass the first scanner, through a guide member and pass a second diagonally offset scanner where the first and second pinch rollers have a tangentially contacting relationship with a first and second sensor port surface of the first and second scanners;

e. scanning and storing image data by flip-flopping between actively scanning with the first and second scanners where said first and second scanners are diagonally offset and the first and second field of views of the first and second scanners are directionally opposed;

f. multiplexing data through an A/D conversion electrical circuit;

g. converting data electronically to a format for electronic storage; and h. transmitting data to a host computer.

8. The method of double-sided scanning of claim 7, where sensing the position of the paper document is sensing optically.

9. The method of double-sided scanning of claim 8, where scanning is scanning with color image capturing sensors and producing a grey scale image.

10. The method of double-sided scanning of claim 8, where stepping the motor drive is stepping a stepper motor and timing gear and pulley mechanism.

11. An apparatus for optically scanning, comprising:

a. a scanner having a first scanner sensor port surface; and b. a pinch roller tangentially related to said scanner sensor port surface and said pinch roller adapted to traction feed a paper document pass said first scanner sensor port.

12. The apparatus for optically scanning of claim 11, further comprising:

a. a second scanner diagonally offset with respect to said first scanner and having a second scanner sensor port surface;

b. a second pinch roller tangentially related to said second sensor port surface for conveying a paper document across the sensor port surface; and c. a drive means operatively connected to said pinch roller.

13. A double-sided optical scanning apparatus comprising:

a. a first scanner having first and second opposing ends with a first field of view directed in a first direction and said first scanner having a first scanner sensor port surface through which an image is viewed;

b. a second scanner having third and fourth opposing ends with a second field of view directed in a second direction opposite said first direction and said second scanner having a second scanner sensor port surface through which an image is viewed and said second scanner diagonally offset with respect to the first scanner; and a first z-bracket having a pivoting point in a central portion of the z-bracket and having first and second extensions where the first and second extensions are mounted to the first and third ends of the first and second scanners, fixing the first and second scanners at diagonally opposed positions and said z-bracket is adapted to rotate about said pivoting point where pivoting increases or decreases a pressure contact between the first and second sensor port surfaces and the first and second pinch rollers respectively.

* * * * *